No. 727,398. PATENTED MAY 5, 1903.
E. U. MACK.
RUBBER TIP ATTACHMENT FOR LEAD PENCILS.
APPLICATION FILED MAR. 10, 1903.
NO MODEL.
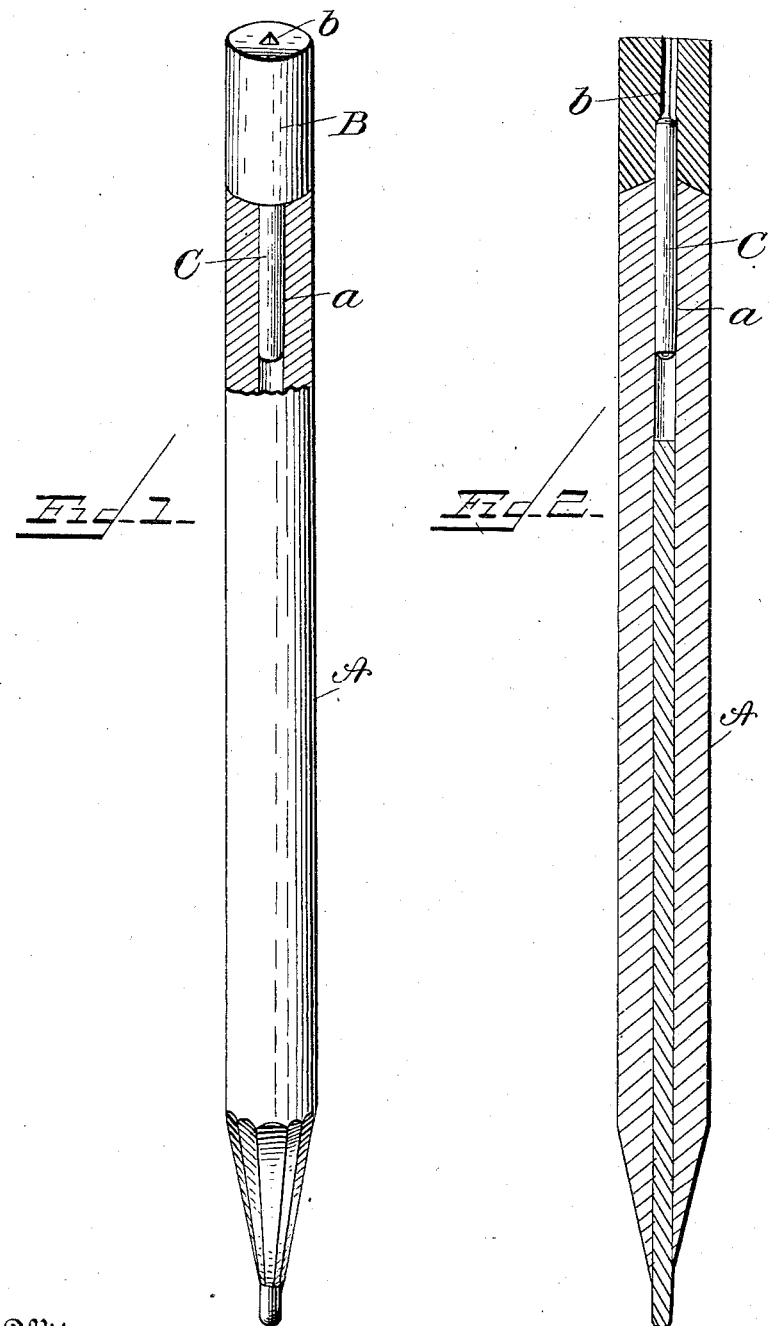

No. 727,398. Patented May 5, 1903.

UNITED STATES PATENT OFFICE.

ERNEST ULMO MACK, OF FLORENCE, SOUTH CAROLINA, ASSIGNOR TO EAGLE PENCIL COMPANY, OF NEW YORK, N. Y.

RUBBER-TIP ATTACHMENT FOR LEAD-PENCILS.

SPECIFICATION forming part of Letters Patent No. 727,398, dated May 5, 1903.

Application filed March 10, 1903. Serial No. 147,144. (No model.)

*To all whom it may concern:*

Be it known that I, ERNEST ULMO MACK, of Florence, in the county of Florence and State of South Carolina, have invented a new and useful Improvement in Rubber-Tip Attachments for Lead-Pencils, of which the following is a specification.

The device in which my invention is comprised consists of a piece of erasive rubber, which is held to the end of the pencil by a supporting-rod, (preferably of metal, such as steel,) which is inserted and fits closely in an opening or channel formed for it in both the rubber and end of the pencil.

The characteristic of the invention is that the supporting-rod is movable lengthwise in both the pencil and the rubber, the advantage of this being that while the rod at all times acts to properly uphold and support the rubber, yet it can readily be adjusted as the rubber wears away. All that is necessary, for example, when the rubber wears down to the end of the rod is to press the rubber endwise against any hard unyielding surface. By the endwise compression of the rubber the rod is forced down deeper into its channel in the pencil, and the rubber when pressure is removed from it will expand, so that its outer face will be beyond the end of the rod. In this way the rubber can be practically entirely used up.

In the drawings, to which I shall now refer for a better understanding of my invention, Figure 1 is a perspective view of a pencil provided with a rubber tip in accordance with my invention, the pencil being partly broken away to show the joint between it and the tip. Fig. 2 is a longitudinal axial section of the same.

A is the lead-pencil of any suitable kind.

B is the rubber tip, which may have any desired external configuration.

In both the tip and the rear end of the pencil is formed an axial channel. That in the tip is lettered $b$ and that in the pencil is lettered $a$.

C is a small metal rod with rounded ends, which fits tightly in both of the channels $a$ and $b$ and serves to hold the tip and pencil together and to support and to give stiffness to the tip. The end of the tip which fits against the end of the pencil may be undercut or concave to fit against the corresponding convexed end of the pencil, as shown in Fig. 2, or it may be straight and flat, as in Fig. 1. The meeting faces of the tip and pencil can also be glued together, if desired.

The channel $a$ in the pencil can be the ordinary lead-holding channel or groove, all that is needed being to remove the lead for a sufficient distance to accommodate the rod C. The channel $a$, it should be remarked, is longer than the portion of the rod C which fits in it at the outset, this being for the purpose of affording room for the longitudinal movement of the rod.

The rod is movable lengthwise in both the pencil and the rubber tip. When the latter wears down to the rod, endwise pressure on the rubber will compress it and force the rod down farther into the channel $a$ in the pencil. As soon as pressure is removed the rubber will expand and in so doing will move outwardly, so as to carry its exposed face beyond the end of the rod C. This operation can be repeated from time to time as occasion arises until the rubber is practically all used up.

What I claim as new herein, and desire to secure by Letters Patent, is—

The pencil provided with a longitudinal channel $a$, a rubber tip provided with a longitudinal channel $b$, and a rod C, for uniting the tip and the pencil, tightly fitting, and capable of lengthwise movement, in said channels, the channel $a$, in the pencil, being of greater length than the portion of the rod which it receives, substantially as and for the purposes hereinbefore set forth.

In testimony whereof I have hereunto set my hand this 6th day of March, 1903.

ERNEST ULMO MACK.

Witnesses:
J. E. SCHOERHOE,
F. W. JONES.